United States Patent
Yamagishi et al.

(10) Patent No.: US 6,937,418 B2
(45) Date of Patent: Aug. 30, 2005

(54) MAGNETIC STORAGE DEVICE HAVING A HEAD SUSPENSION SUPPORTING A HEAD SLIDER

(75) Inventors: Michinaga Yamagishi, Kawasaki (JP); Takenori Ohshima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 256 days.

(21) Appl. No.: 10/283,885

(22) Filed: Oct. 30, 2002

(65) Prior Publication Data

US 2003/0147170 A1 Aug. 7, 2003

(30) Foreign Application Priority Data

Feb. 5, 2002 (JP) ........................................ 2002-028496

(51) Int. Cl.⁷ ............................................. G11B 12/02
(52) U.S. Cl. ............................................................ 360/75
(58) Field of Search ........................... 360/77.02, 234.7, 360/294.4, 294.5

(56) References Cited

U.S. PATENT DOCUMENTS

| | | | | |
|---|---|---|---|---|
| 4,605,977 A | * | 8/1986 | Matthews | 360/234.7 |
| 6,545,846 B1 | * | 4/2003 | Chee et al. | 360/294.4 |
| 2002/0039261 A1 | * | 4/2002 | Sividasan et al. | 360/294.5 |
| 2002/0043894 A1 | * | 4/2002 | Koganezawa et al. | 310/328 |
| 2003/0007269 A1 | * | 1/2003 | Alex | 360/31 |

FOREIGN PATENT DOCUMENTS

JP 5-347078 12/1993

* cited by examiner

*Primary Examiner*—David Hudspeth
*Assistant Examiner*—Mitchell R Slavitt
(74) *Attorney, Agent, or Firm*—Greer, Burns & Crain, Ltd.

(57) ABSTRACT

A magnetic storage device, includes a head slider that floats having a designated height against a moving magnetic recording medium and has an element for recording, and a head suspension that supports the head slider and is provided at a head arm, wherein the floating height of the head slider can be adjusted, based on a recording frequency, by a deformation element.

15 Claims, 4 Drawing Sheets

MAGNETIC STORAGE DEVICE HAVING A HEAD SUSPENSION SUPPORTING A HEAD SLIDER

BACKGROUND OF THE INVENTION

1. Field of the Invention

The present invention generally relates to magnetic storage devices, and more particularly, to a magnetic storage device having a head suspension supporting a head slider.

2. Description of the Related Art

In a magnetic disk device that is a typical magnetic storage device, a head slider having an element for recording and regeneration is supported by a head suspension. In addition, the head slider floats stably at a minute height from a surface of a rotating magnetic disk, so that information is recorded and regenerated.

FIG. 1 is a perspective view of a head suspension of the related art. Referring to FIG. 1, a recording datum is transmitted from a central processing unit (CPU) of a personal computer (PC) connected to a magnetic disk device to a head IC 112 on a head suspension 100 through a main IC 111.

The recording datum is converted to an electric current signal by the head IC 112 so as to be transmitted to a minute element 114 for recording of a head slider 113. The recording datum as the electric current signal is converted to a magnetic field signal by a conductive coil of the element 114 for recording, so as to be recorded to a magnetic disk (not illustrated) applied by the magnetic field signal. The datum recorded to the magnetic disk is regenerated by a minute element 115 for regenerating of the head slider 113 so as to be transmitted to the CPU by a process reversing the process for recording.

Meanwhile, the head slider 113, fixed to a head end of the head suspension 100, generates a floating force by using air flow based on rotation of the magnetic disk, because of a configuration of an air bearing surface 113-1 facing the magnetic disk.

On the other hand, the head suspension 100, supporting the head slider 113, generates a load force pushing the head slider 113 to the magnetic disk by a spring part 100-3 of the head suspension 100. The head slider 113 floats stably at a minute floating height from the surface of the magnetic disk because of a balance of the floating force and the load force.

The load force is a spring load of the head suspension 100. A base part 100-1 of the head suspension 100 is a cantilever fixed to an end part 121-1 of a head arm 121. In addition, the head suspension 100 is bent to the side of the magnetic disk at a bending position 100-4 of the spring part 100-3 between the base part 100-1 and a head slider fixing part 100-2 situated at the head end of the head suspension 100. The load force is determined by a product of the spring constant and the bent amount of the above mentioned spring part 100-3.

The bent amount of the above mentioned spring part 100-3 is defined as a deformation amount of the head slider fixing part 100-2 from a state where no floating force is applied to a state where the floating force is applied to the head slider 113 so as to float. Therefore, for instance, as the floating height increases, the deformation amount of the head slider fixing part 100-2 increases so as to increase the bent amount of the spring and increase the load force. The direction of the deformation is the floating direction of the head slider 113. The direction of the deformation is defined as the Z directions in FIG. 1.

On the other hand, the floating force is generated by pressure of an air flow that flows in the head slider 113 based on the rotation of the magnetic disk. Therefore, in a case where the floating height of the head slider 113 is low, the pressure of the air flow increases so that the floating force increases. In addition, as the floating height increases, the pressure of the air flow decreases so that floating force is decreased.

Therefore, the head slider 113 floats stably with a floating height balanced between the load force and the floating force. The floating height is a distance from the surface of the magnetic disk to a head end of a magnetic pole of the element 114 for recording of the head slider 113.

Meanwhile, recently, higher density recording has been in demanded. Because of this, it has been attempted to position the air bearing surface of the head slider 113 as close to the surface of the magnetic disk as possible, in order to secure a regeneration output. The floating height of the head slider 113 is reduced to approximately 30 nm.

On the other hand, as the frequency of a signal treated by an information processing device becomes high, it is required for the recording frequency of a signal recorded to the magnetic disk to have a value that exceeds the present 200 MHz, for example to rise to approximately 500 MHz. Thus, as the recording frequency increases, an exothermic amount of energy from a conductive coil of the element 114 for recording increases due to a high frequency eddy current lost, for example. In addition, an exothermic amount of energy of the head IC 112 disposed to the head suspension 100 also increases.

The temperature of the head suspension 100 itself increases due to the above mentioned exothermic amounts of energy so that the head suspension 100 extends due to thermal expansion. In this case, assuming that the floating force is not applied to applied to the head slider 113, the head slider 113 itself extends in a direction approaching the surface of the magnetic disk. Therefore, the bent amount (the deformation amount in a Z direction) of the head suspension 100 from the above state to the state where the floating force is applied to the head slider 113 increases. As a result of this, the load force of the head suspension 100 increases so that the balance between the load force and the floating force of the head slider 113 is lost and the floating height decreases to the height where the balance is regained.

As described above, since the floating height of the head slider 113 is minute, the head slider 113 may come in contact with the surface of the magnetic disk. In a case where the head slider 113 comes in contact with the surface of the magnetic disk, a signal waveform regenerated by the element for regenerating becomes abnormal. Hence, a protection layer of the surface of the magnetic disk may be destroyed or the air bearing surface of the head slider may be destroyed.

SUMMARY OF THE INVENTION

Accordingly, it is a general object of the present invention to provide a novel and useful magnetic storage device, in which one or more of the problems described above are eliminated.

Another and more specific object of the present invention is to provide a magnetic storage device by which a stable floating height of a head slider is secured by a head suspension.

The above objects of the present invention are achieved by a magnetic storage device, including a head slider that floats having a designated height against a moving magnetic recording medium and has an element for recording, and a head suspension that supports the head slider and is provided at a head arm, wherein the floating height of the head slider can be adjusted, based on a recording frequency, by a deformation element.

According to the above mentioned invention, a bent amount of a spring of the head suspension is varied by expanding and contracting a deformation element based on a recording frequency, so that the change of a load force is controlled. Because of this, it is possible to keep a balance between the load force and a floating force of the head slider. Therefore, it is possible to make the floating height of the head slider stable so that a magnetic storage device having high reliability can be realized.

The magnetic storage device may further include a control unit configured to control an amount of a deformation of the deformation element. The control unit may be a frequency discrimination circuit.

According to the above mentioned invention, it is possible to control the change of the floating height of the head slider precisely by controlling the expansion and contraction of the deformation element with a clock signal for generating the recording datum. As a result of this, it is possible to make the floating height of the head slider stable.

Other objects, features, and advantages of the present invention will become more apparent from the following detailed description when read in conjunction with the accompanying drawings.

DETAILED DESCRIPTION OF THE PREFERRED EMBODIMENTS

A description will now be given, with reference to FIGS. 2 through 6, of embodiments of the present invention.
<First Embodiment>

A first embodiment is illustrated in FIGS. 2 through 5. That is, the first embodiment is an example where a deformation element is provided between a head slider and a head suspension.

Figure 2:
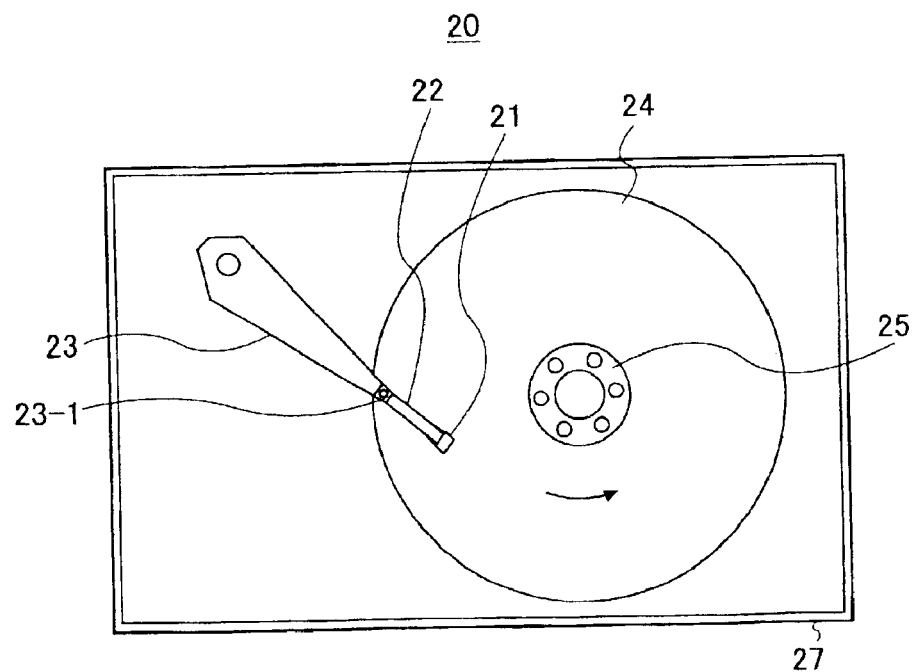
FIG. 2 is a plan view showing a main part of a magnetic disk device of the present invention.

FIG. 2 is a plan view showing a main part of a magnetic disk device 20 of the present invention. Referring to FIG. 2, a head slider 21 having a element 13 for recording (not shown in FIG. 2), a head suspension 22, a head arm 23, a magnetic disk 24, a hub 25 and others are provided inside of a housing 27 of a magnetic disk device 20.

The head suspension 22 is provided to an end part 23-1 of the head arm 23. The head slider 21 is fixed to a head end of the head suspension 22. The magnetic disk 24 is disposed to the hub 25 that is rotated by a motor not illustrated. In the magnetic disk device 20 having the above mentioned structure, the head slider 21 having the element 13 for recording floats stably above a surface of the magnetic disk 24 that rotates in a direction indicated by an arrow in FIG. 2, with a minute height. And thereby, information is recorded to the magnetic disk 24 by the element 13 for recording.

Figure 3:
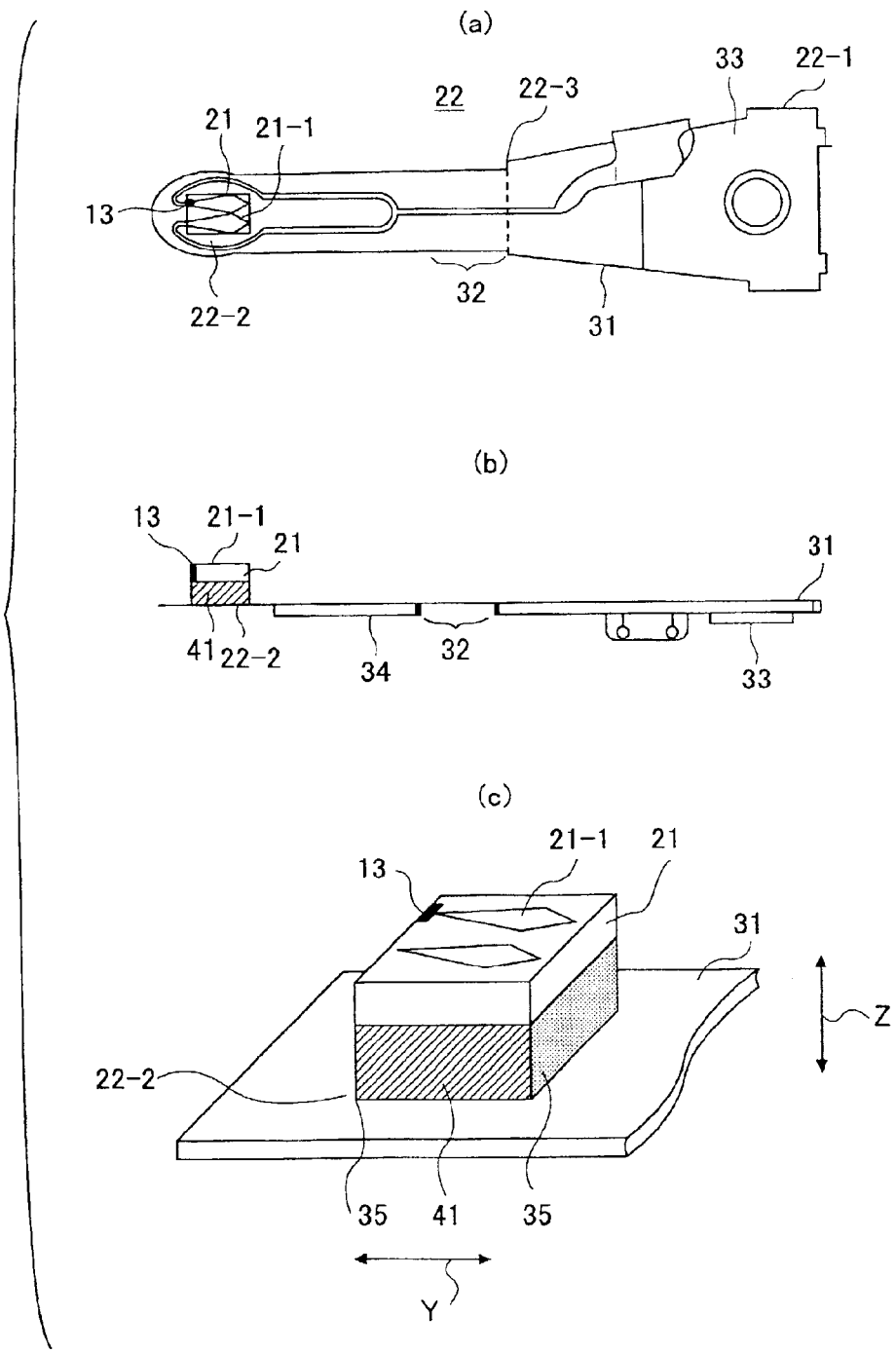
FIG. 3 contains views showing a head suspension of the first embodiment of the present invention.

FIG. 3 contains views showing the head suspension 22 of the first embodiment of the present invention, and more particularly, FIG. 3-(a) is a plan view thereof, FIG. 3-(b) is a cross sectional view thereof, and FIG. 3-(c) is a perspective view of an expanded view of a head end part of the head suspension 22.

Referring to FIG. 3, an air bearing surface 21-1 of the head slider 21 of the head suspension 22 is provided so as to face the magnetic disk 24. The head suspension 22 is fixed to an end part 23-2 of the head arm 23 shown in FIG. 2 by a spacer 33 of a base part 22-1.

In a case where an actuator (not illustrated) connected to the head arm 23 is driven, information can be recorded to the entire surface of the magnetic disk 24 by the element 13 for recording of the head slider 21.

A base material 21 of the head suspension 22 is a thin board having a thickness of approximately 25 $\mu$m and made of stainless, for example. The spacer 33 is fixed to the base part 22-1 by welding. A head slider fixing part 22-2 is formed at the head end of the head suspension 22. The head slider 21 is fixed to the head slider fixing part 22-2.

Furthermore, a rigid body part formed by a rib 34 bent in a longitudinal direction of the head suspension 22 is provided at the head suspension 22. A spring part 32, having a relatively lower rigidity than the rigid body part, is provided at the head suspension 22.

The head suspension 22 is bent to the side toward the magnetic disk 24 at a bending position 22-3 between the spring part 32 and the base part 22-1. The spring part 32 functions as a thin board spring so as to generate a load force to push the head slider 21 toward the magnetic disk 24.

A deformation element 41 is provided between the head slider fixing part 22-2 of the head suspension 22 and the head slider 21. The deformation element 41 is fixed to the head slider fixing part 22-2. The head slider 21 is fixed on the deformation element 41 by glueing, sticking, or the like. Alternatively, the deformation element 41 is formed at one side of a surface of the head slider 21 and the head slider fixing part 22-2 by a vacuum deposition method, a sputtering method, or the like, so as to be fixed.

The deformation element 41 is expanded and contracted by an electric filed applied by a pair of electrodes provided at the deformation element 41. For example, the deformation element 41 is selected from a piezoelectric element, an electric strain element or the like. A ceramic material having a PZT (a solid solution of lead zirconate titanate) or BaTiO$_3$ (barium titanate) as a base material can be used as the piezoelectric element. In addition, for example, lead-magnesium-niobium crystal can be used as the electric strain element.

In this embodiment, the PZT element is used for the deformation element 41. That is, the deformation element 41 that is a PZT element is fixed to the head slider fixing part 22-2 of the suspension 22. The head slider 21 is fixed on the deformation element 41. It is preferable that the size of the deformation element 41 is bigger than the size of the head slider 21 so as to simplify fixing the deformation element 41 to the head slider 21.

Furthermore, as shown in FIG. 3-(c), a pair of electrodes 35 are provided on a surface of the deformation element 41 in a direction perpendicular to the Z directions, namely Y directions that are the longitudinal axis directions of the suspension 22, for example. In a case where a voltage is applied to the electrodes 35, the deformation element 41 is contracted in the Z directions.

For example, if the deformation element 41 of the head slider 21 floating with some floating height is contracted in the upward Z direction, the amount of deformation of the spring of the head suspension 22 is decreased. As a result of this, the load force is reduced. On the other hand, the floating force is not changed based on the above mentioned construction. Therefore, the floating force becomes bigger than the load force so that the floating height increases to the height where the floating force is again balanced with the load force.

Figure 4:
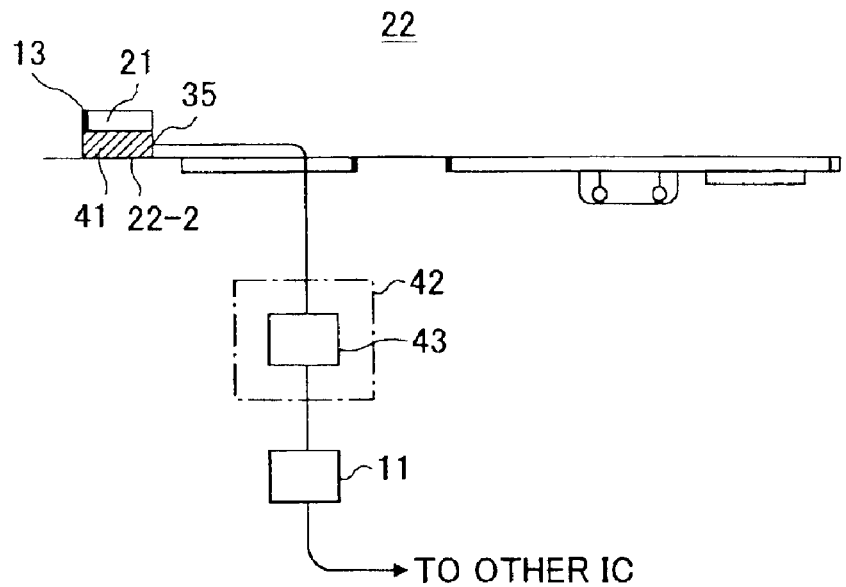
FIG. 4 is a view showing a head suspension connected to a frequency discrimination circuit of the first embodiment of the present invention.
Figure 5:
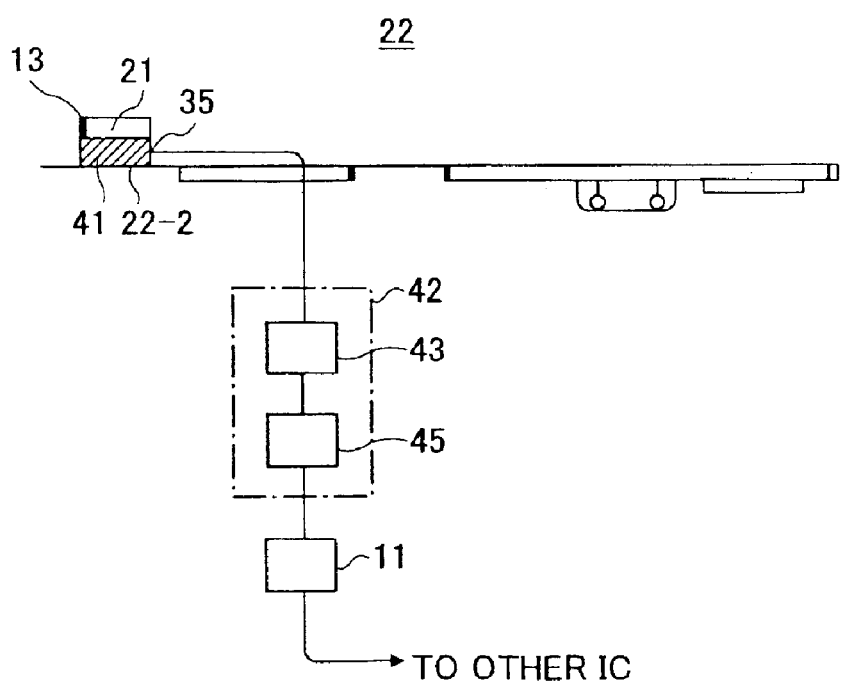
FIG. 5 is a view showing a head suspension connected to a filter circuit and the frequency discrimination circuit of the first embodiment of the present invention.

Meanwhile, FIG. 4 is a view showing a head suspension connected to a frequency discrimination circuit of the first embodiment of the present invention. FIG. 5 is a view showing a head suspension connected to a filter circuit and the frequency discrimination circuit of the first embodiment of the present invention.

Referring to FIGS. 4 and 5, a control unit 42 configured to control an amount of deformation of the deformation element 41 is connected to the electrode 35. A main IC 11 and others are connected to the control unit 42. A frequency discrimination circuit 43 can be used as the control unit 42, for example.

The head suspension 22 is shown in FIG. 4, in a case where the control unit is the frequency discrimination circuit 43. Referring to FIG. 4, a clock signal for generating the recording datum from the main IC 11 is transmitted to the frequency discrimination circuit 43.

A frequency-voltage conversion is implemented in the frequency discrimination circuit 43 so that a voltage signal having a designated relationship to the frequency of the clock signal is output to the electrode 35 of the deformation element 41. An integrated circuit, for example, can be used as a circuit for implementing the frequency-voltage conversion. In addition, the above mentioned "designated relationship" is defined as a relationship between an amount of the contraction of the deformation element 41 and a change of the floating height of the head slider 21 based on the contraction of the deformation element 41, for example.

When the frequency of the clock signal increases, the frequency of the recording datum increase. As a result of this, heat of the conductive coil of the element 13 for recording and the head IC increases. Because of the increase in heat, the temperature of the head suspension 22 itself increases so that the head suspension 22 extends due to the thermal expansion.

In this case, assuming that the floating force is not applied to the head slider 21 as a hypothetical case, the head slider 21 itself extends in a direction where the head slider 21 approaches the surface of the magnetic disk. Therefore, a bent amount (an amount of a deformation in a Z direction) increases from the above mentioned state to a state where the floating force is applied to the head slider 21. As a result of this, the load force of the head suspension 22 increases. Accordingly, the balance between the load force of the head suspension 22 and the floating force of the head slider 22 is lost. Hence, the floating height is decreased until the load force of the head suspension 22 and the floating force of the head slider 22 are again balanced.

On the other hand, according to the present invention, at the control circuit 43, the deformation 41 is contracted based on the frequency of the recording datum. Therefore, as described above, it is possible to increase the floating height of the head slider 22. Hence, it is possible to prevent the decrease of the floating height due to the above mentioned heat expansion. As a result of this, the head slider 21 coming in contact with the surface of the magnetic disk 24 due to the decrease of the floating height can be avoided. Accordingly, it is possible to realize the magnetic disk device having high reliability.

Meanwhile, the head suspension 22 is shown in FIG. 5 in a case where the control unit comprises the filter circuit 45 and the frequency discrimination circuit 43.

Referring to FIG. 5, the recording datum is transmitted from the main IC 11 to the filter circuit 45. A data line having a specific frequency is extracted in the filter circuit 45. A signal comprising the data line is transmitted to the frequency discrimination circuit 43 so as to be implemented as a frequency-voltage conversion in the frequency discrimination circuit 43.

The voltage signal that is converted is output to the electrode 35 of the deformation element 41. A substantially same circuit as the first embodiment can be used as a circuit for the frequency discrimination circuit 43. Under the above mentioned structure, it is possible to obtain substantially the same action and effect as the ones shown in FIG. 4.

<Second Embodiment>

Figure 6:
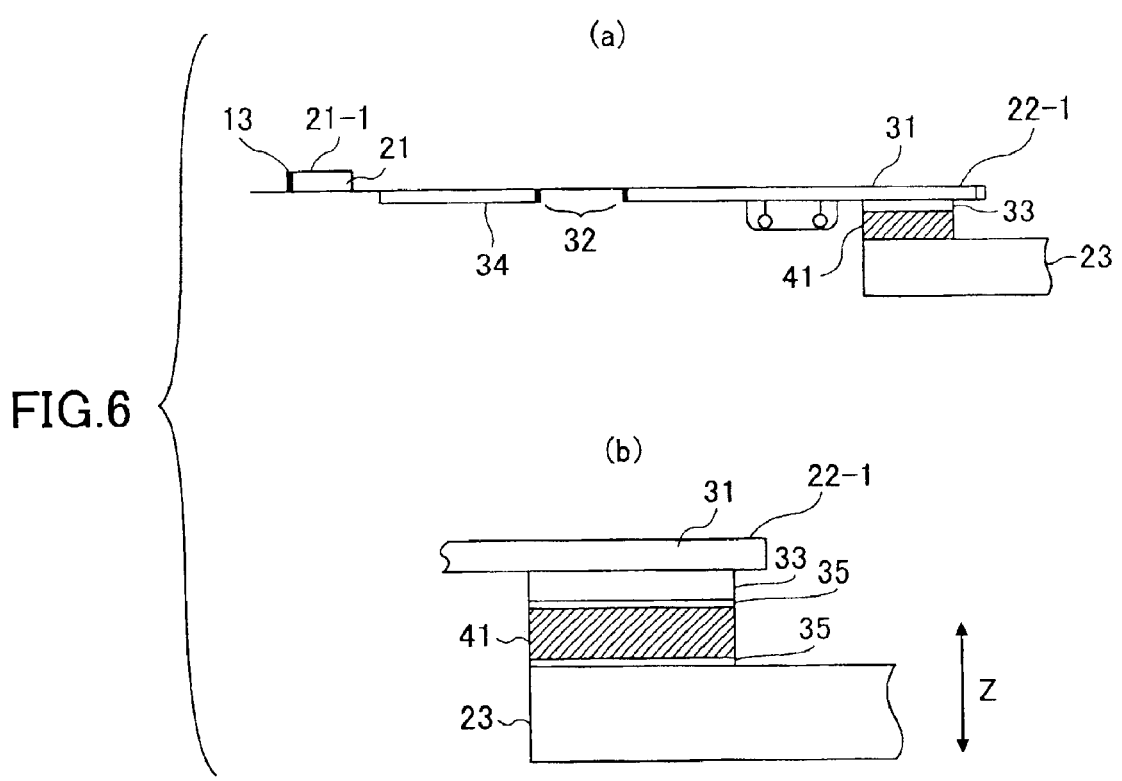
FIG. 6 is a view showing a head suspension of the second embodiment of the present invention.

Next, a second embodiment will be described. In the second embodiment, as shown in FIGS. 2 and 6, a deformation element is provided between the head arm and the head suspension. FIG. 6 is a view showing a head suspension 22, provided to the head arm 23, of the second embodiment of the present invention, and more particularly, FIG. 6-($a$) is a cross sectional view thereof and FIG. 6-($b$) is a cross sectional and expanded view of a fitting part of the head suspension 22.

Figure 1:
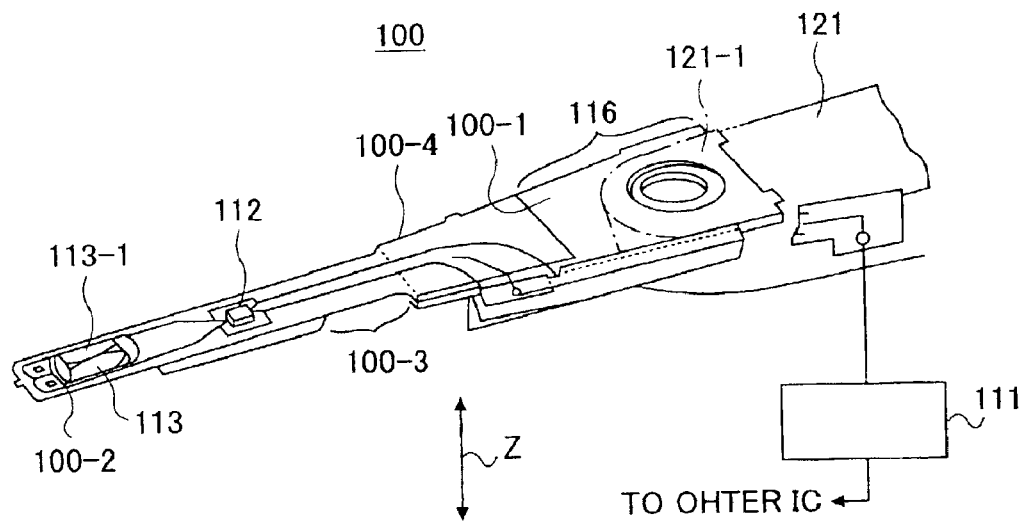
FIG. 1 is a perspective view of a head suspension 100 of the related art.

A substantially same magnetic disk device as the one of the first embodiment shown in FIG. 1 is used as a magnetic storage device of the second embodiment.

Referring to FIG. 6, a deformation element 41 is provided between the spacer 33 of the head suspension base part 22-1 and the end part 23-1 (shown in FIG. 2) of the head arm 23 by a substantially same method as the first embodiment, so as to be fixed. The deformation element 41 may be provided between the base material 31 of the head suspension 22 of the base part 22-1 and the spacer 33.

Furthermore, as well as the first embodiment, the deformation element 41 may be formed on a surface of the end part 23-1 (shown in FIG. 2) of the head arm 23, the base material 31 of the head suspension 22, or the spacer 33 by a vacuum deposition method, a sputtering method, or the like.

A substantially same element as the first embodiment can be used as the deformation element 41. Here, as an example, the PZT element is used. It is preferable that the size of the deformation element 41 is the substantially same as the size of the spacer 33 so as to simplify fixing the deformation element 41.

As shown in FIG. 6-($b$), a pair of electrodes 35 are provided on a surface in Z directions of the deformation element 41. In a case where the voltage is applied to the electrode 35, the deformation element 41 extends in the Z directions. In this case, for example, head slider 21 floating at some floating height moves in a direction where the head slider 21 moves further away from the magnetic disk 24. Therefore, the bent amount of the spring of the head suspension 22 (an amount of deformation in the Z directions) decreases. Hence, the load force is reduced. Accordingly, the floating force becomes larger than the load force so that the floating height increases until the floating force is again balanced with the load force.

A substantially same control unit as in the first embodiment can be used as a control unit configured to control the deformation of the deformation element 41.

Because of the above mentioned structure of the head slider 21, the substantially same action and effect as in the first embodiment can be obtained in the second embodiment.

Thus, according to the magnetic storage device of the first embodiment and the second embodiment, it is possible to control the change of the floating height of the head slider 21 due to heat expansion of the head suspension 22 and others, by expanding and contracting the deformation element 41 provided at the head suspension 22. Because of this, a protection layer of the magnetic recording medium such as the magnetic disk 24 is prevented from being destroyed by the head slider 21 contact with a magnetic recording medium such as the magnetic disk 24. That is, the air bearing surface of the head slider 21 can be prevented from being destroyed. Accordingly, it is possible to realize a magnetic storage device having a high recording density with high reliability.

The present invention is not limited to these embodiments, but variations and modifications may be made without departing from the scope of the present invention.

This patent application is based on Japanese priority patent application No. 2002-28496 filed on Feb. 5, 2002, the entire contents of which are hereby incorporated by reference.

What is claimed is:

1. A magnetic storage device, comprising:
   a head slider that floats having a designated height against a moving magnetic recording medium and has an element for recording; and
   a head suspension that supports the head slider and is provided at a head arm,
   wherein a deformation element is expanded and contracted by an electric field applied by a pair of electrodes provided at the deformation element, corresponding to a recording frequency, so that the floating height of the head slider can be adjusted.

2. The magnetic storage device as claimed in claim 1, wherein the deformation element is provided between the head slider and the head suspension.

3. The magnetic storage device as claimed in claim 1, wherein the deformation element is provided between the head arm and the head suspension.

4. The magnetic storage device as claimed in claim 1, further comprising:
   a control unit configured to control an amount of a deformation of the deformation element.

5. The magnetic storage device as claimed in claim 2, further comprising:
   a control unit configured to control an amount of a deformation of the deformation element.

6. The magnetic storage device as claimed in claim 3, further comprising:
   a control unit configured to control an amount of a deformation of the deformation element.

7. The magnetic storage device as claimed in claim 4, wherein the control unit is a frequency discrimination circuit.

8. The magnetic storage device as claimed in claim 5, wherein the control unit is a frequency discrimination circuit.

9. The magnetic storage device as claimed in claim 6, wherein the control unit is a frequency discrimination circuit.

10. The magnetic storage device as claimed in claim 4, wherein the control unit includes a filter circuit and a frequency discrimination circuit.

11. The magnetic storage device as claimed in claim 5, wherein the control unit includes a filter circuit and a frequency discrimination circuit.

12. The magnetic storage device as claimed in claim 6, wherein the control unit includes a filter Circuit and a frequency discrimination circuit.

13. The magnetic storage device as claimed in claim 1, wherein the deformation element is selected from a piezoelectric element and an electric strain element.

14. The magnetic storage device as claimed in claim 2, wherein the deformation element is selected from a piezoelectric element and an electric strain element.

15. The magnetic storage device as claimed in claim 3, wherein the deformation element is selected from a piezoelectric element and an electric strain element.

* * * * *